2,911,903

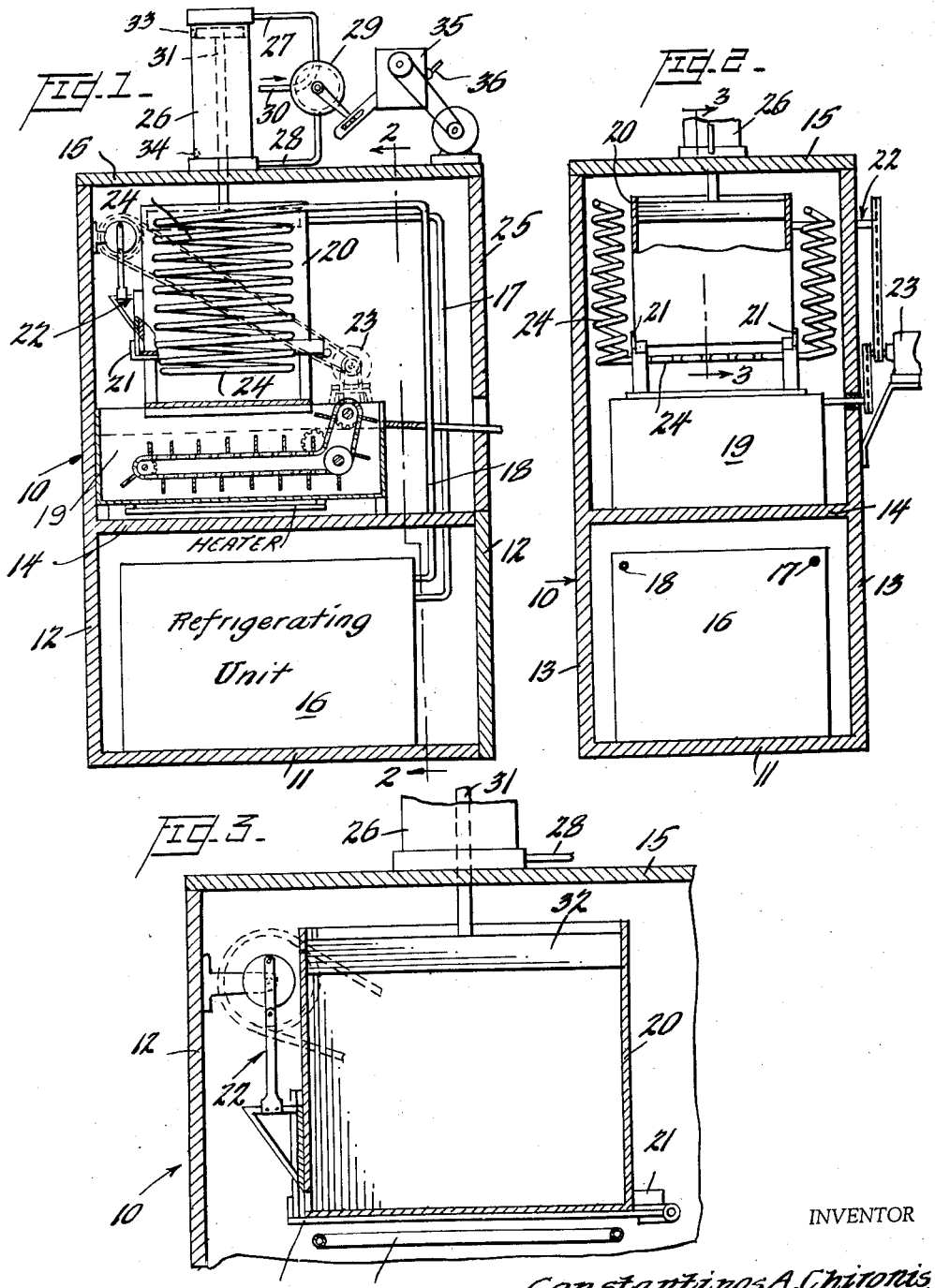

MACHINES FOR COOKING EDIBLE ARTICLES IN DEEP FAT

Constantinos A. Chironis, Atlantic City, N.J.

Application April 15, 1958, Serial No. 728,658

4 Claims. (Cl. 99—353)

The present invention relates to new and useful improvements in machines for cooking edible articles in deep fat, employing continuous production methods.

The invention is an improvement over the apparatus disclosed in my prior United States Patent No. 2,811,914, issued November 5, 1957, which discloses apparatus for cooking articles in a deep fat, comprising a tank for holding the fat, a heater beneath the tank, an endless conveyor mounted in the tank and provided with a plurality of outstanding partitions, a removable hopper mounted above the tank for holding batter, said hopper provided with a plurality of openings above the confines of the tank, a reciprocable plunger mounted for movement to and from a position above said hopper to a position near the bottom of said hopper, and a reciprocal knife for severing slices of batter forced through said openings by said plunger, said conveyor moving the said slices as they rise through the hot fat to the far side of the tank and then upwardly so that they may drop from the tank when they reach a level above the level of the top of the tank.

In accordance with the present invention, the batter is maintained under refrigeration and delivered hydraulically at a uniform rate. At the same time, a machine is provided which includes a removable hopper in which the desired batter is to be poured, and then this batter is placed under hydraulic pressure and portions of the batter are forced through at least one opening and then sliced to drop into hot fat or oil in which the batter is engaged by a conveyor which moves through the hot fat or oil and which carries the batter up an incline prior to dropping the cooked batter into a suitable receptacle for storage.

It is important that the hopper be easily and quickly removable after it is empty so that the new one can be quickly placed in position; and while the batter from the hopper just installed is used, the empty hopper which has been removed may be washed and filled with a new batch of batter.

A feature of the invention is the provision of apparatus including only two relatively small motors so that the cost of construction and operation of the machine may be reduced to a minimum.

The invention will now be more fully described with reference to the accompanying drawings in which:

Fig. 1 is a side view of illustrative apparatus constructed in accordance with the invention, portions thereof being diagrammatic, with the housing being shown in section so that the functional parts of the apparatus may be seen;

Fig. 2 is a cross-section taken on the line 2—2 of Fig. 1; and

Fig. 3 is a cross-section taken on the line 3—3 of Fig. 2.

Referring to the drawings, the numeral 10 designates a housing, comprising a bottom 11, front and rear walls 12, side walls 13, intermediate supporting platform 14 and upper supporting platform 15. The front wall is movable or removable, preferably in sections, to permit servicing of the apparatus.

Mounted within the housing 10 beneath the intermediate platform 14 is a refrigerating unit 16 which is connected to lines 17 and 18 for the purpose of supplying refrigerating fluid for purposes to be described hereinafter.

Mounted upon the intermediate platform 14 is a cooking unit 19 which comprises a tank, doughnut conveyor means and heating means, as is all more fully described in my prior Patent 2,811,914. The tank, doughnut conveyor, heater and a fat level illustrated by a dotted line are shown in Fig. 1 together with an opening in the hopper 20 for ejection of batter. Mounted above the cooker 19 is a slidably positioned hopper 20, the construction of the hopper and angle irons upon which it is slidably mounted being fully set forth in my prior Patent 2,811,- 914. Detachably secured to the hopper 20 and mounted upon the interior of the rear wall 12 is a reciprocating knife unit indicated generically by the numeral 22. The conveyor forming part of the cooker 19 and the knife unit 22 are each driven at controlled speed by the motor 23, the present apparatus being structurally identical in this respect with the structure disclosed in my prior Patent 2,811,914.

In order to achieve superior operation with the deep fat cooking apparatus of my prior Patent 2,811,914, it has been found necessary to maintain the batter under refrigeration to permit the batter to be stored for periods of time until use of the apparatus is desired. Further, efficient operation requires that the batter be supplied to the knife unit at a precise uniform rate of speed so that each of the doughnuts which are produced, for example, will contain precisely the same amount of batter as the other doughnuts which are produced.

To achieve this result, it has been found that controlled refrigeration of the batter will cause the batter to possess and maintain a definite consistency. When this definite consistency of the batter is combined with a batter feed supply which is based on a given feeding pressure instead of a given rate of movement of reciprocating plunger as in my prior patent, the batter is delivered more uniformly and precisely, and the deep fat frying machine of my prior patent is made substantially more desirable and useful.

It is also desired to achieve the improved operation which has been referred to above while retaining the advantages inherent in the operation of the apparatus of my prior patent and particularly the feature of rapid replacement of the batter-containing hopper.

The hopper 20 is surrounded on each side thereof, and preferably also on the undersurface thereof, with cooling coils 24 which function to refrigerate the hopper 20 and the batter therein. Thermostatic means, not shown, are employed to detect the temperature of the batter and to turn the refrigerating unit 16 on and off as is well understood in the art and is conventional in most refrigerating applications.

The important point is that the location of the cooling coils 24 adjacent the sides of the hopper 20 and preferably also beneath the hopper 20 is such as to permit effective refrigeration of the hopper and its batter contents. At the same time, the sliding movement of the hopper 20 along the angle iron 21 is not interfered with, and quick and easy replacement of hopper 20 in the manner indicated in Patent 2,811,914 is permitted. A portion of the front wall 12 indicated by the numeral 25 is shiftable or removable to permit the operator to have access to the hopper 20.

Supported upon the upper platform 15 is a double-acting fluid-operated cylinder 26 fitted at its upper and lower ends respectively with fluid lines 27 and 28 respectively, these fluid lines communicating with a valve 29 which also communicates with a source of fluid under pressure (not shown) through fluid supply line 30.

When valve 29 is in the position shown in Fig. 1, fluid under pressure is supplied to line 27 and piston 31 is forced downwardly to cause plunger 32 to enter hopper 20 and express the batter contents therefrom.

Suitable limit switches 33 and 34 are provided to actuate valve 29 to reverse the movement of piston 31 in a manner which will be obvious to those familiar with double-acting cylinders so that the plunger 32 will be raised above the level of the hopper 20 when this hopper is emptied of its batter contents.

Thus, when lower limit switch 34 is contacted, valve 29 is actuated to connect lines 30 and 28 to return piston 31 to its upper position in which the plunger 32 is clear of the hopper 20. Upper limit switch 33 is optional and can be used to automatically place valve 29 in a neutral position when piston 31 is retracted in cylinder 26. The mechanism for operating valve 29 is diagrammatically shown in Fig. 1 and identified by numeral 35. The valve operating mechanism 35 normally includes a manual switch 36 for placing filled valve 29 in the position shown in Fig. 1 after a fresh filled hopper 20 has been slid into place.

The invention is defined in the claims which follow.

I claim:

1. In apparatus for cooking articles in a deep fat, comprising a tank for holding the fat, a heater beneath the tank, an endless conveyor mounted in the tank and provided with a plurality of outstanding partitions; a removable hopper mounted above the tank for holding batter, said hopper provided with a plurality of openings above the confines of the tank, a reciprocable plunger mounted for movement to and from a position above said hopper to a position near the bottom of said hopper, and a reciprocal knife for severing slices of batter forced through said openings by said plunger; said conveyor being adapted to move the said slices as they rise through the hot fat to the far side of the tank and then upwardly so that they may drop from the tank when they reach a level above the level of the top of the tank, the improvement which comprises refrigerating coils positioned adjacent at least the sides of said removable hopper to maintain said batter at a predetermined constant refrigerating temperature and fluid-operated means for operating said plunger.

2. An improvement as recited in claim 1 in which said fluid-operated means for operating said plunger comprises a piston secured to said plunger and a fluid-operated double-acting cylinder associated with said piston.

3. An improvement as recited in claim 2 in which said fluid-operated means for operating said plunger includes a lower limit switch operative to automatically raise said plunger to its upper position clearing the top of said hopper when said plunger reaches the bottom of its batter-discharging stroke.

4. An improvement as recited in claim 1 in which said hopper is mounted for horizontal sliding movement whereby said hopper may be easily replaced when said plunger is in its upper position clearing the top of said hopper.

References Cited in the file of this patent

UNITED STATES PATENTS

| | | |
|---|---|---|
| 756,259 | Malone | Apr. 5, 1904 |
| 1,506,232 | Fleming | Aug. 26, 1924 |
| 2,003,617 | Toews | June 4, 1935 |
| 2,077,395 | Chapel | Apr. 20, 1937 |
| 2,083,829 | Carpenter | June 15, 1937 |
| 2,463,112 | Kipnis | Mar. 1, 1949 |